No. 808,254.  
PATENTED DEC. 26, 1905.  
L. P. PEKRUL.  
WATER GATE.  
APPLICATION FILED DEC. 27, 1904.

Witnesses:  
Otto E. Hoddick.  
Mary B. Dunn.

Leo. P. Pekrul.  
Inventor:  
by _____ Attorney.

UNITED STATES PATENT OFFICE.

LEO P. PEKRUL, OF DENVER, COLORADO, ASSIGNOR TO CLARENCE D. BUTCHART, OF DENVER, COLORADO.

WATER-GATE.

No. 808,254.   Specification of Letters Patent.   Patented Dec. 26, 1905.

Application filed December 27, 1904. Serial No. 238,416.

*To all whom it may concern:*

Be it known that I, LEO P. PEKRUL, a citizen of the United States, residing at Denver, in the county of Denver and State of Colorado, have invented new and useful Improvements in Water-Gates, of which the following is a specification.

My invention pertains to improvements in the means of connecting water-gates to pipe, preferably vitrified salt-glazed sewer-pipe, commonly called "tile;" and the object of my improvement is to provide means by which a water-gate may be tightly, easily, durably, and quickly connected to pipe and in such manner that when the pipe is already laid the water-gate may be connected thereto without cutting away the reservoir embankment or dam and in such manner that when the pipe is made of clay or other fragile material the liability of the pipe being broken by the connection is reduced to a minimum.

With the foregoing in mind my invention will be fully understood from the following description, taken in connection with the accompanying drawings, forming part of this specification, in which—

Figure 1:
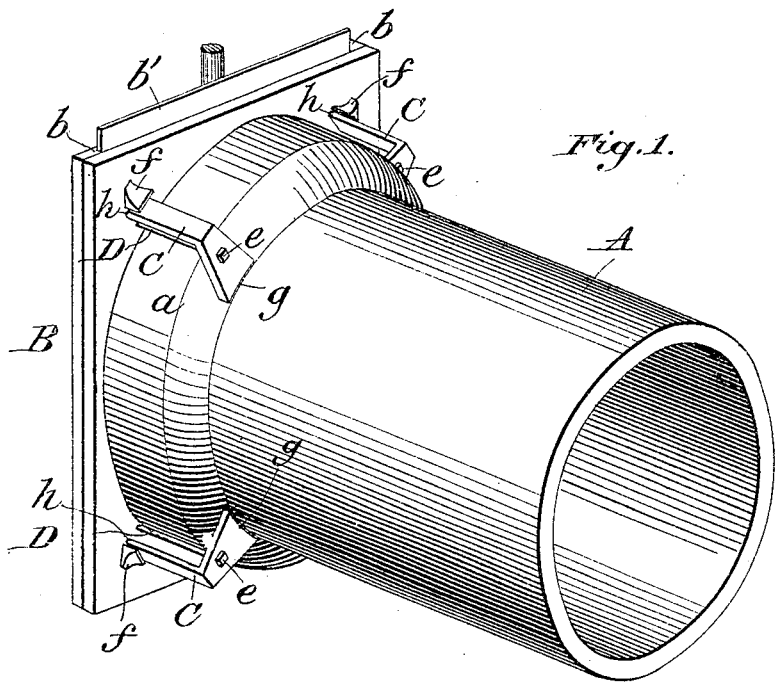
Figure 2:
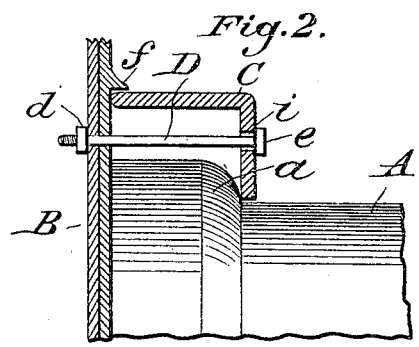
Figure 3:
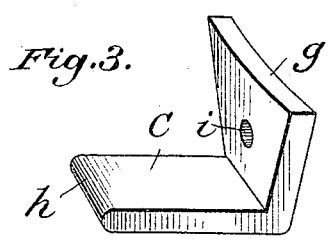

Figure 1 is a perspective view showing my improvement in the means of connecting a water-gate to a pipe. Fig. 2 is a detail view, partly in elevation and partly in longitudinal vertical section, illustrating the arrangement of a water-gate, a pipe, and my novel connecting means. Fig. 3 is a perspective view of one of the clamps removed, comprising my means of connection.

Similar letters refer to similar parts throughout the several views.

A is a pipe of clay or other suitable material having a bell $a$.

B is a water-gate—that is, a frame having ways $b$ to guide a slide $b'$. Said frame is placed flat against the bell end of pipe A, as shown in Fig. 1.

My novel means for connecting a water-gate to a pipe comprises four (more or less) clamps C, of cast metal or other suitable material, and bolts D, equipped with nuts $d$, as shown in Fig. 2. The clamps C have their rear inner surfaces or bearings $g$ sufficiently concave to closely engage or receive the bell $a$ and have longitudinal bores $i$, somewhat larger than the diameter of bolts D. These clamps are arranged about the pipe, preferably at each corner of the water-gate frame, as shown in Fig. 1. The rear ends $g$ of the clamps C bear against the rear of bell $a$ of pipe, and their forward ends, which are slightly convex, as shown at $h$ in Fig. 3, butt against the rear side of water-gate frame B, as shown. These clamps are prevented from being forced off frame B in the application of my connection by stops $f$, cast on frame B, as shown in Fig. 2. The bolts D connect the frame B and the clamps C and are preferably arranged, as shown, in the bores $i$ of the clamps C with their heads $e$ in the rear ends of the clamps and their nuts $d$ in front of water-gate frame B, as shown in Fig. 2. The bores $i$ in Fig. 3 being slightly larger in diameter than the diameter of bolts D, permitting the bolts to work loosely in the bores, and the forward ends of the clamps being convex, as shown at $h$ in Fig. 3, cause the forward ends of the clamps to swing or rock directly outward upon the application of the connection, thereby imposing the pressure on the clamps instead of on the bell of pipe, thus reducing to a minimum the liability of breaking the pipe by tightening the bolts and also allowing for any variation in the size of bells $a$ of pipe A.

In applying my improvements the water-gate B is placed against bell $a$ end of pipe. The bolts D are passed through bores $i$ of clamps C, the forward convex $h$ ends of the clamps being set inside the stops $f$ and the rear inner ends $g$ resting on the rear of bell $a$. Bolts D are then passed through the bores in the water-gate frame and the nuts turned on the bolts and drawn as tight as necessary. With this done it will be observed that the water-gate is held closely against the bell end of the pipe in a strong and durable manner and without liability of its becoming casually disconnected or displaced. The connecting means being simple is easily and quickly made. My connection also possesses the advantage of being easily connected to a pipe when the latter is already laid in the reservoir embankment or dam with only the bell end of the pipe protruding through the said embankment or dam, thus avoiding the sometimes difficult proceeding of excavating or cutting away a portion of reservoir embankment or dam. When it is desired to remove the water-gate from the pipe, this is readily done by simply turning the nuts $d$ of the bolts D and then drawing the frame and bolts away from the pipe.

I enter into a detailed description of the construction and relative arrangement of the parts embraced in the present and preferred embodiments of my invention in order to impart a full, clear, and exact understanding of said embodiment. I do not desire, however, to be understood as confining myself to such specific construction and relative arrangements of parts, as such changes and modifications may be made in practice as fairly fall within the scope of my invention as claimed.

Having described my invention, what I claim, and desire to secure by Letters Patent, is—

1. The combination with a pipe having a bell, of a frame provided with stops on its rear surface, a water-gate engaging the frame and disposed in front of the pipe, and clamps grouped about the bell of the pipe and whose extremities engage the bell and the rear surface of the frame respectively, and fastening means distinct from the clamps for connecting the latter with the water-gate frame, the forward ends of the clamps engaging the stops on the frame.

2. In a water-gate and pipe connection, the combination of clamps having rectangular forward parts with convex forward ends, capable of rocking or swinging on the water-gate frame, having triangular-shaped rear parts with concave rear inner ends engaging the rear outer part of the bell or pipe, the rear ends of the clamps having large horizontal bores, and bolts smaller than the bores, equipped with nuts and extending through the clamps and frame.

3. In a water-gate and pipe connection, the combination of clamps having convex forward ends capable of swinging or rocking on the rear side of the water-gate frame, the latter being provided with stops on its rear side to prevent the clamps from slipping off the water-gate frame, the clamps having concave rear inner ends engaging the bell of the pipe, and large horizontal bores; and bolts smaller than the clamp-bores, and equipped with nuts extending through the bores of the clamps and the water-gate frame.

4. The combination with a pipe having a bell, of a frame which the bell engages in the rear, a water-gate engaging the frame in front of the pipe, clamps arranged about the bell of the pipe and whose extremities bear against the bell and the rear surface of the frame respectively, and fastening means distinct from the clamps, for connecting the latter to the frame, the extremities of the clamps being free to adjust themselves to the pipe-bell and frame respectively, as the fastening means are tightened.

In testimony whereof I have hereunto set my hand in the presence of two subscribing witnesses.

LEO P. PEKRUL.

Witnesses:
H. C. BELLERSHEIM,
D. D. SEERIE.